US008341173B2

(12) United States Patent
Li et al.

(10) Patent No.: US 8,341,173 B2
(45) Date of Patent: Dec. 25, 2012

(54) METHOD AND SYSTEM FOR DATABASE-BASED SEMANTIC QUERY ANSWERING

(75) Inventors: Han Yu Li, Beijing (CN); Sheng Ping Liu, Beijing (CN); Jing Mei, Beijing (CN); Yuan Ni, Beijing (CN); Guo Tong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 12/858,723

(22) Filed: Aug. 18, 2010

(65) Prior Publication Data

US 2011/0055240 A1    Mar. 3, 2011

(30) Foreign Application Priority Data

Aug. 31, 2009  (CN) .......................... 2009 1 0166845

(51) Int. Cl.
*G06F 17/30* (2006.01)
(52) U.S. Cl. .................. 707/763; 707/713; 707/759
(58) Field of Classification Search .................. None
See application file for complete search history.

(56) References Cited

U.S. PATENT DOCUMENTS

| | | | |
|---|---|---|---|
| 7,027,974 B1* | 4/2006 | Busch et al. ...................... 704/4 |
| 2004/0034651 A1* | 2/2004 | Gupta et al. ................... 707/102 |
| 2004/0059736 A1* | 3/2004 | Willse et al. .................. 707/100 |
| 2005/0097628 A1* | 5/2005 | Lussier et al. ................. 800/260 |
| 2007/0233627 A1* | 10/2007 | Dolby et al. ...................... 706/45 |
| 2008/0033993 A1* | 2/2008 | Uceda-Sosa ............... 707/104.1 |
| 2008/0172353 A1* | 7/2008 | Lim et al. ........................ 706/47 |
| 2008/0201280 A1* | 8/2008 | Martin et al. .................... 706/12 |

OTHER PUBLICATIONS

Alan L Rector, "Modularisation of Domain Ontologies Implemented in Description Logics and related formalisms including OWL", ACM, 2003.*
Baader et al, "Number Restrictions on Complex Roles in Description Logics: A Preliminary Report", Germany, 1996.*
Baader et al, "Tableau Algorithms for Description Logics", Germany, 2000.*
Sebastian Brandt, "Polynomial Time Reasoning in a Description Logic with Existential Restrictions, GCI Axioms, and-What Else?", Germany, 2004.*
Glimm et al, "Conjunctive Query Answering for the Descrition Logic SHIQ", IJCAI, 2007.*
Golbreich et al, "The Foundational Model of Anatomy in OWL: Experience and Perspectives", 2006.*
Grosof et al, "MIT Sloan School of Management", 2003.*
Lutz et al, "Conjunctive Query Answering in EL using a Database System", 2008.*
Lutz et al, "Conjunctive Query Answering in the Description Logic EL using a Relational Database System", 2009.*
Haase et al, "Complexity of Subsumption in the EL Family of Description Logics: Acyclic and Cyclic TBoxes", 2008.*
Lutz, et al., "Conjunctive Query Answering in EL using a Database System," in Proc of the int WS on OWL: experiences and directions (OWLED'08), 2008.

* cited by examiner

*Primary Examiner* — Apu Mofiz
*Assistant Examiner* — Hung Le
(74) *Attorney, Agent, or Firm* — Vazken Alexanian (57) ABSTRACT

A computer-implemented method, computer-implemented system, and a computer program product for answering a database-based query of a computerized database system. The method includes: generating a canonical individual ind' with respect to a role and a concept, for an existential restriction in an ontology used in the computerized database system; converting implicit data in original data into explicit data using the canonical individual ind' and the ontology; and retrieving an answer meeting all query conditions in a query from the original data and the converted explicit data. The computer-implemented system includes: a canonical individual generation unit; a data conversion engine; and a query unit.

6 Claims, 4 Drawing Sheets

METHOD AND SYSTEM FOR DATABASE-BASED SEMANTIC QUERY ANSWERING

CROSS-REFERENCE TO RELATED APPLICATIONS

This application claims priority under 35 U.S.C. §119 to Chinese Patent Application No. 200910166845.7 filed Aug. 31, 2009, the entire contents of which are incorporated by reference herein.

BACKGROUND OF THE INVENTION

1. Field of the Invention

The present invention generally relates to relational databases. In particular, the present invention relates to a system for database-based semantic query answering where individual data in the database is enriched using ontological knowledge and the method thereof, which can implement database-based semantic query answering efficiently.

2. Description of the Related Art

With the mass application of databases, efficiently retrieving data required by a user of the database has become an urgent problem. Particularly, as EMRs (Electronic Medical Records) are widely used, efficient retrieval of clinical documents according to a user's requirement has become an urgent need.

The IHE XDS (Cross Enterprise Document Sharing) provides an architecture for managing the sharing and retrieval of clinical documents between healthcare enterprises. In the XDS, the query of clinical documents is restricted to the metadata provided during the submission of the documents, such as the submission time and patient ID. However, many of the user's query requirements focus on the contents of the clinical documents, for example, finding patients with some clinical observations who are eligible for a clinical trial.

In general, keyword-based search is used to retrieve the content-based clinical documents. Compared with the formal query languages, such as SQL (Structured Query Language) in database systems and the query language in logic systems, keyword-based search suffers in that: (1) the keywords cannot fully capture the user's requirements; and (2) the completeness of the results cannot be guaranteed.

The Health Level 7 Clinical Document Architecture (CDA) proposes a widely adopted standard to represent the electronic medical record. In addition to the hierarchical structure of documents, CDA also specifies the semantic meaning of the document content to avoid ambiguity in information exchange. A key characteristic of CDA is the frequent use of ontological (terminological) references, such as SNOMED-CT (Systematized Nomenclature of Medicine-Clinical Term), which is a well-known ontology in healthcare domain. Fragments of CDA documents are associated with the ontological concepts defined in SNOMED-CT whose expressivity is of the Description Logic Language EL+[1]. For example, the following CDA document fragment states an observation of finger injury for a patient:

This document fragment includes an ontological reference to the concept of "Finger injury" originally defined in SNOMED-CT as follows:

| Finger injury | is-a | Disorder |
| | finding-site | Finger |

The concept "Finger injury" is a sub-concept of "Disorder" and each instance of "Finger injury" has a finding site that is an instance of "Finger". In SNOMED-CT, the body structure "Finger" is also defined with respect to the role "partOf": "Finger" is defined as part of "Hand" (that is, the role "partOf"), and "Hand" is defined as part of "Upper Limb". More expressively, the role "partOf" is transitively defined, which means if a is part of b (a partOf b) and b is part of c (b partOf c) then a is part of c (a partOf c).

The ontological references in CDA documents are the key enabler for semantic query of the CDA documents because the CDA documents can be interpreted as fact assertions about the ontology. For example, the above CDA fragment can be interpreted as a clinical document having an observation that is an instance of the concept "Finger injury". These assertions can be represented by the RDF (Resource Description Framework) triples as:

| ex:CDA_doc_1 | rdf:type | ex:CDADocument . |
| ex:CDA_doc_1 | ex: hasObservation | ex:obs_1 . |
| ex: obs_1 | rdf:type | sct:FingerInjury . |

A sample query for CDA documents is shown below as an example, e.g., querying which documents having observations of disorders with the finding site at "Finger".

Q(x):—ex:CDADocument(x), ex: hasObservation(x, y), sct:Disorder(y), sct:findingSite(y, z), sct:Finger(z).

There are only assertions about "FingerInjury" in the RDF triples of the above document, without any reference to the "findingSite". Therefore, direct data retrieval cannot help in returning the above CDA document as a result, and those documents implicitly describing the "findingSite" at "Finger" cannot be queried.

Query answering on healthcare data is critical. Currently, healthcare data has been widely annotated by healthcare ontologies, such as SNOMED-CT and Gene ontologies, whose expressivity is of the Description Logic Language EL+, and thus query answering on healthcare data should leverage ontology reasoning to provide sound and complete answers. By SNOMED-CT ontology reasoning, the assertion about the finding site in the above CDA document may be obtained in the example above. However, the above method with SNOMED-CT ontology reasoning requires ontology reasoning on each CDA document. Due to the fact that healthcare ontologies and data are often large-scaled, the above method may generate a huge amount of reasoning results,

```
<Observation>
    <code code="ASSERTION" codeSystem="2.16.840.1.113883.5.4"/>
        <value xsi:type="CD" code="52011008" codeSystem="2.16.840.1.113883.6.96"
            codeSystemName="SNOMED-CT" displayName="Finger injury">
        </value>
</Observation>
``` which may degrade the performance of the query answering system, making it unable to handle queries efficiently.

Similarly, in other fields with large-scaled ontologies and data, a similar problem exists in producing complete reasoning for ontologies while efficiency processing query answering.

SUMMARY OF THE INVENTION

According to an aspect of the present invention, a method for answering a database-based query of a computerized database system is provided. The method includes: generating a canonical individual ind' with respect to a role and a concept, for an existential restriction in an ontology used in the computerized database system; converting implicit data in original data into explicit data using the canonical individual ind' and the ontology; and retrieving an answer meeting all query conditions in a query from the original data and the converted explicit data.

According to another aspect of the present invention, a computer-implemented system for answering a database-based query of a computerized database system is provided. The computer-implemented system includes: a canonical individual generation unit, configured to generate a canonical individual ind' with respect to a role and a concept for an existential restriction in an ontology used in the computerized database system; a data conversion engine, configured to convert implicit data in original data into explicit data by using the canonical individual ind' and the ontology; and a query unit, configured to retrieve an answer meeting all query conditions in a query from the original data and the converted explicit data.

According to another aspect of the present invention, an article of manufacture tangibly embodying computer readable instructions which when implemented, causes a computer to carry out the steps of the method.

BRIEF DESCRIPTION OF THE DRAWINGS

FIG. 3($a$) illustrates a fork query according to a specific example of the present invention;

FIG. 3($b$) illustrates a schematic of the relationships between generated data according to a specific example of the present invention;

DETAILED DESCRIPTION OF THE INVENTION

Exemplary embodiments of the present invention will be described in conjunction with the accompanying drawings hereinafter. For clarity and simplicity, not all characteristics of practical embodiments are described in the specification. However, it is appreciated that, many embodiment-specific decisions have to be made in developing the practical embodiments, in order to achieve a particular object of the developer, e.g., the accordance with a system or a service associated restricting conditions that may be changeable depending on different embodiments. Furthermore, it should be understood that the development may be complex and time-consuming although it is just routine work for those skilled in the art benefiting from the disclosure. It should also be noted that apparatus structures and/or processing steps closely related to the technical solution of the present invention are illustrated in the figures, with other details little related to the present invention omitted, so that the present invention would not be blurred by unnecessary details.

For better understanding of the principle of the present invention, SNOMED-CT ontology knowledge whose expressivity is of the Description Logic Language EL+ and CDA healthcare data are used as an example hereinafter. However, those skilled in the art should understand that the present invention is not limited to SNOMED-CT ontology knowledge and corresponding CDA healthcare data, but can be applied in all sorts of relational data and their associated ontology knowledge.

First, the database-based semantic query answering system and the method thereof according to an embodiment of the present invention are described hereinafter with reference to FIG. 1 to FIG. 4.

Figure 1:
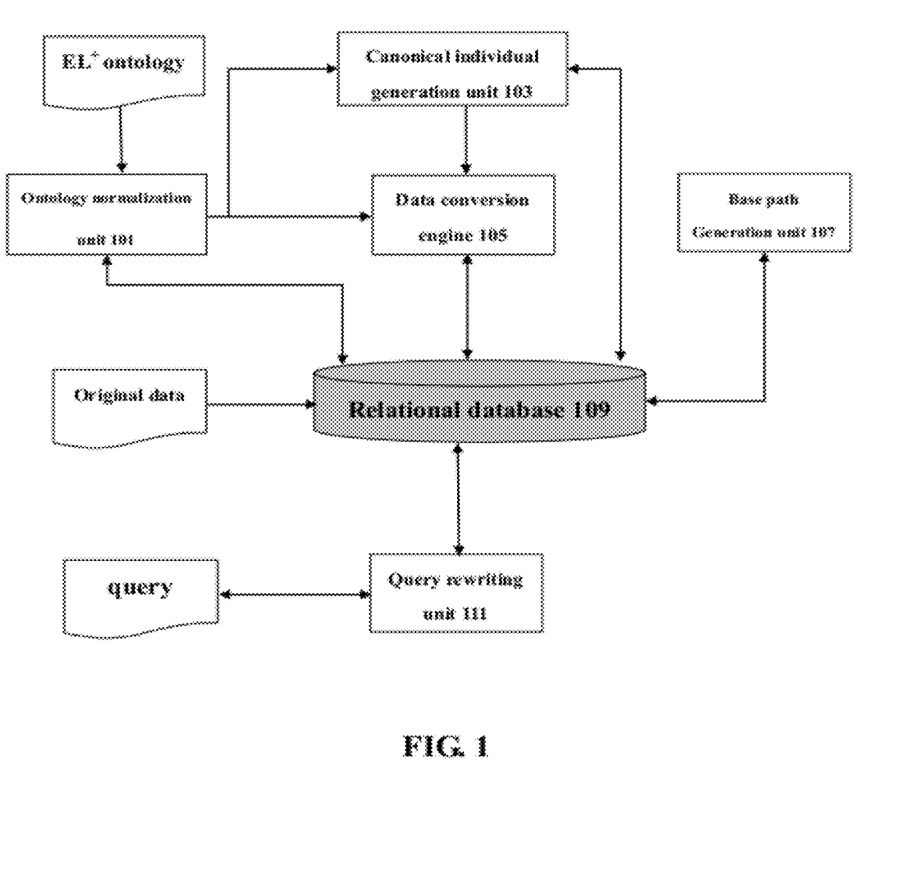
FIG. 1 illustrates a structural block diagram of the database-based semantic query answering system according to an embodiment of the present invention.

As shown in FIG. 1, a database-based semantic query answering system according to an embodiment of the present invention includes: an ontology normalization unit 101, a canonical individual generation unit 103, a data conversion engine 105, a base path generation unit 107, a relational database 109, and a query rewriting unit 111.

Here, the relational database 109 is used to store original data and various data generated by the ontology normalization unit 101, the canonical individual generation unit 103, the data conversion engine 105 and the base path generation unit 107 which will be described later. In the embodiment of the present invention, membership triples are stored in the form of instance type, and relationship triples are stored in the form of instance role.

The ontology normalization unit 101 normalizes concept axioms and role axioms in the EL+ ontology knowledge, and converts original data into data in the form of atomic concept subsumption, data in the form of intersection concept subsumption, data in the form of existential restriction left subsumption, data in the form of existential restriction right subsumption, data in the form of role subsumption, and data in the form of role chain subsumption according to the normalized concept axioms and role axioms. The ontology normalization unit 101 stores the various data after conversion in the relational database 109.

The canonical individual generation unit 103 generates a canonical individual ind' with respect to the role R and the concept B for an existential restriction ∃R.B in the ontology EL+. Herein, ∃R.B denotes there is a relationship with a role of R for concept B. The canonical individual generation unit 103 also stores the generated canonical individual and corresponding role and concept in the relational database 109.

The data conversion engine 105 converts the implicit data in the original data into explicit data using the canonical individual generated by the canonical individual generation unit 103 and the EL+ ontology. In the embodiment of the present invention, by using the original data, the data generated by the ontology normalization unit 101, and the canonical individual generated by the canonical individual generation unit 103 and its corresponding role and concept, the data conversion engine 105 generates triple data with respect to the original data and the canonical individual and stores them in the relational database 109, based on the normalized concept axioms and role axioms from the ontology normalization unit 101.

The base path generation unit 107 generates a base path starting from a named individual and ending up with a canonical individual, using the original data, data generated by the ontology normalization unit 101, the canonical individual generated by the canonical individual generation unit 103 and its corresponding role and concept, and data generated by the data conversion engine 105, in order to realize database-based semantic query. In an embodiment of the present invention, the base path generation unit 107 traverses the relational graph configured from data in the form of instance role with respect to the named individual and the canonical individual, and data in the form of instance type with respect to the canonical individual, computes a base path starting from the named individual and ending up with the canonical individual, and stores all the base paths in the relational database 109 in the form of triples of the base path, a tail of the base path, and nodes directly or indirectly located on the base path.

After the completing and enriching of the relational database 109 by the ontology normalization unit 101, canonical individual generation unit 103, data conversion engine 105 and the base path generation unit 107, the query rewriting unit 111 appends a query condition for the fork in the query, in order to guarantee the completeness of the answers. In the embodiment of the present invention, the query rewriting unit 111 appends the following query condition for the fork in the query: in the case that a root variable of the fork is matched with a canonical individual, a base path is required to exist such that all matching of variables in the fork are nodes directly or indirectly located in the base path.

The database-based semantic query answering system according to the embodiment of the present invention not only completes the knowledge in relational databases using the ontology normalization unit 101, the canonical individual generation unit 103, the data conversion engine 105, the base path generation unit 107, without the exponential growth of data, but also guarantees completeness of the answers with improved query efficiency by appending a query condition for a fork in the query using the query rewriting unit 111.

The operation principle of each module included in the database-based semantic query answering system according to the embodiment of the invention, the ontology normalization unit 101, the canonical individual generation unit 103, the data conversion engine 105, the base path generation unit 107, the relational database 109, and the query rewriting unit 111, will be described in detail hereinafter in conjunction with a specific example.

First, according to a specific example of the invention, in the relational database 109 various original data in the form of RDF triples are converted in their storage form. For example, RDF membership triple with an individual "ind" which is a type of a concept "concept" is converted to be stored in the form of instance type, i.e., a table TYPEOF(ind, concept). RDF relationship triple with a relationship role between an individual ind1 and ind2 is converted to be stored in the form of instance role, i.e., a table RELATIONSHIP(ind1, role, ind2).

For example, the RDF triple from the above mentioned CDA document segment can be stored in the relational database 109 according to an embodiment of the present invention in the follow form:
TYPEOF(ex:CDA_doc_1, ex:CDADocument)
RELATIONSHIP(ex:CDA_doc_1, ex: hasObservation, ex:obs_1)
TYPEOF(ex:obs_1, sct:FingerInjury)

The ontology normalization unit 101 normalizes the concept axioms and the role axioms in the ontology knowledge into an atomic concept subsumption axiom sub⊆sup, an intersection concept subsumption axiom sub1 ∩sub2⊆ sup, an existential restriction left subsumption axiom ∃role.sub⊆ sup, an existential restriction right subsumption axiom sub⊆ ∃role.sup, a role subsumption axiom role1 ⊆ role2, and a role chain subsumption axiom role1°role2⊆ role3.

Here, "sub" represents a subclass concept, "sup" represents a superclass concept, and "role" represents a role. The atomic concept subsumption axiom sub⊆ sup represents that the subclass "sub" is subsumed by the superclass "sup"; the intersection concept subsumption axiom sub1 ∩sub2 ⊆ sup represents that the conjunction of a subclass "sub1" and a subclass "sub2" is subsumed by the superclass "sup", the existential restriction left subsumption axiom ∃role.sub⊆ sup represents that the existential restriction with respect to the role "role" and the concept "sub" is subsumed by the superclass "sup", the existential restriction right subsumption axiom sub⊆ ∃role.sup represents that the concept "sub" is subsumed by existential restriction with respect to the role "role" and the concept "sup", and the role subsumption axiom role1 ⊆ role2 represents that a role "role1" is subsumed by a role "role2". In addition, the role chain subsumption axiom role1 °role2 ⊆ role3 represents that if individuals a and b have a relationship "role1" and individuals b and c have a relationship "role2" then individuals a and c have a relationship "role3" therebetween. For details on the processing of ontology normalization, please refer to "Baader F, Brandt S, Lutz C. Pushing the EL envelope. In Proc. of the 19th Joint Int. Conf. on Artificial Intelligence (IJCAI 2005), 2005", the detailed description thereof is omitted here.

Figure 2:
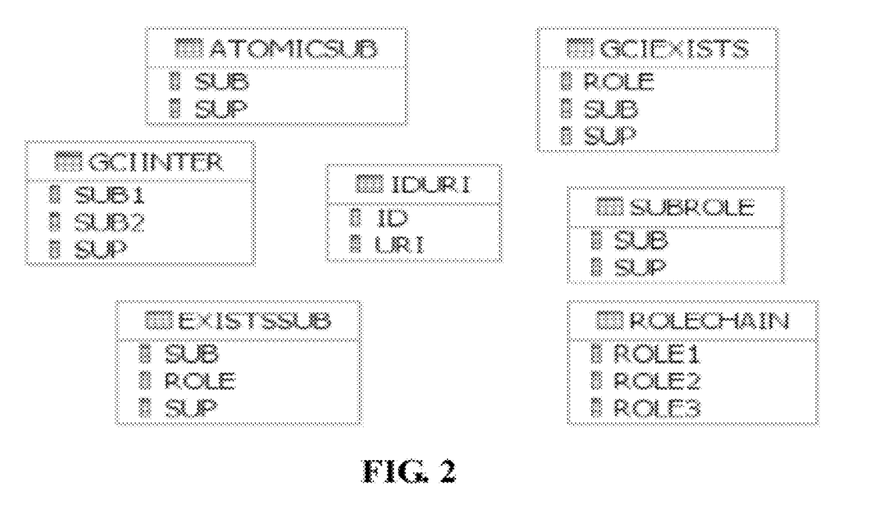
FIG. 2 illustrates a data storage form after normalization of concept axioms and role axioms in an ontology according to an embodiment of the present invention.
Figure 3:
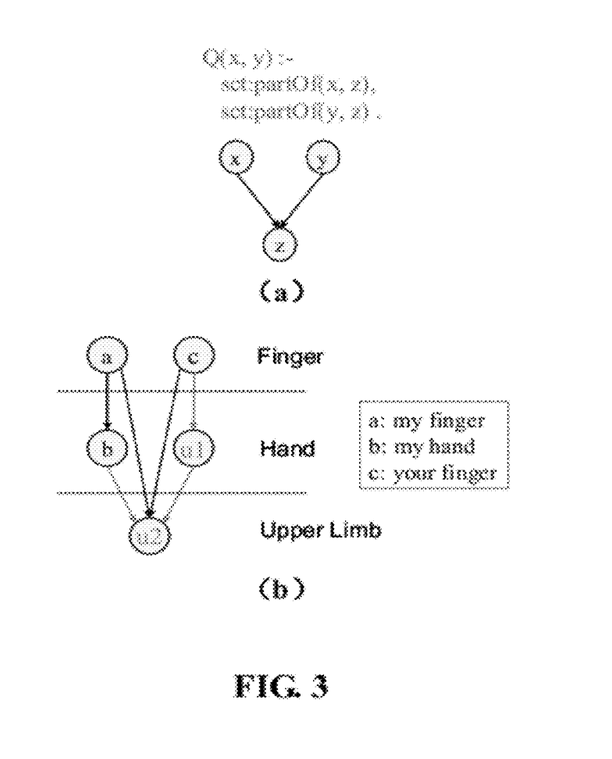

Here, according to an embodiment of the present invention, the above axioms after the normalization of the ontology normalization unit 101 are stored in the relational database 109 in an atomic concept subsumption table ATOMICSUB (SUB, SUP), an intersection concept subsumption table GCI-INTER(SUB1, SUB2, SUP), an existential restriction left subsumption table GCIEXISTS(ROLE, SUB, SUP), an existential restriction right subsumption table EXISTSSUB (SUB, ROLE, SUP), a role subsumption table SUBROLE (ROLE, ROLE'), and a role chain subsumption table ROLECHAIN(ROLE1, ROLE2, ROLE3), respectively. FIG. 2 illustrates a specific data storage form after normalization of concept axioms and role axioms in the ontology according to an embodiment of the present invention. In addition to the above tables, FIG. 2 also includes a table IDURI(ID, URI) for storing all Uniform Resource Identifiers (URIs) of the individuals, concepts and roles in the ontology and the internal identifiers (IDs) assigned for them in the relational database 109.

For example, according to an embodiment of the present invention, the above mentioned SNOMED-CT concept "FingerInjury" can be stored as ATOMICSUB(sct:FingerInjury, sct:Disorder) and EXISTSSUB(sct:FingerInjury, sct:findingSite, sct:Finger). Another example, as part of "Hand", "Finger" can be stored as EXISTSSUB(sct:Finger, sct:partOf, sct:Hand). Similarly, as part of "UpperLimb", "Hand" can be stored in the relational database 109 as EXISTSSUB(sct: Hand, sct:partOf, sct:UpperLimb). In addition, the transitive role "partOf" in SNOMED-CT can be stored in the relational database 109 as ROLECHAIN(sct:partOf, sct:partOf, sct: partOf).

For an existential restriction ∃R.B in the ontology, the canonical individual generation unit 103 generates a canonical individual ind' with respect to the role R and the concept B, and stores the generated canonical individual ind' and corresponding role R and concept B in the relational database 109 in the form of CANONIND(ind', R, B).

For example, for the existential restriction of findingSite at Finger discussed above, the canonical individual generation unit 103 can generate a canonical individual ex:uuu_1 and store it in the relational database 109 in the form of a table CANONIND(ex:uuu_1, sct:findingSite, sct:Finger).

The data conversion engine 105 converts the implicit data in the original data into explicit data using the ontology knowledge and the canonical individual ind' generated by the canonical individual generation unit 103. Particularly, according to an embodiment of the present invention, Datalog rules are defined and inferred for the normalized concept axioms and role axioms from the ontology normalization unit 101 respectively, as shown in Table 1.

In addition, according to an embodiment of the present invention, the data conversion engine 105 further adopts the well-known bottom-up strategy to infer iteratively and evaluate each of the Datalog rules, until no new triples are generated.

TABLE 1

Datalog rules for normalized EL+ axioms

| EL+ axiom | Datalog rule |
|---|---|
| sub ⊑ sup | TYPEOF(ind, sup):- ATOMICSUB(sub, sup), TYPEOF(ind, sub) |
| sub1 ∩ sub2 ⊑ sup | TYPEOF(ind, sup):- GCIINTER(sub1, sub2, sup), TYPEOF(ind, sub1), TYPEOF(ind, sub2) |
| ∃ role.sub ⊑ sup | TYPEOF(ind1, sup):- GCIEXISTS(role, sub, sup), RELATIONSHIP(ind1, role, ind2), TYPEOF (ind2, sub) |
| sub ⊑ ∃role.sup | RELATIONSHIP(ind, role, ind'), TYPEOF(ind', sup):- EXISTSSUB(sub, role, sup), TYPEOF(ind, sub), CANONIND(ind', role, sup) |
| role1 ⊑ role2 | RELATIONSHIP(ind1, role2, ind2):- SUBROLE(role1, role2), RELATIONSHIP(ind1, role1, ind2) |
| role1 °role2 ⊑ role3 | RELATIONSHIP(ind1, role3, ind3):- ROLECHAIN(role1, role2, role3), RELATIONSHIP(ind1, role1, ind2), RELATIONSHIP(ind2, role2, ind3) |

In the inference shown in Table 1, the data structure following ":-" is the premise, and the data structure before ":-" is the conclusion. For example, for the atomic concept subsumption axiom sub ⊑ sup, the data conversion engine 105 generates data in the form of instance type with respect to the superclass concept, TYPEOF(ind, sup), according to data in the form of atomic concept subsumption ATOMICSUB(sub, sup) and data in the form of instance type with respect to the subclass concept TYPEOF(ind, sub). This means that, if a subclass concept "sub" is subsumed by another superclass concept "sup" and the individual "ind" is an instance type of the subclass concept "sub", then "ind" can be inferred as an instance type of the superclass concept "sup". For example, in the specific example discussed above, because data exists in the form of atomic concept subsumption, ATOMICSUB(sct:FingerInjury, sct:Disorder), and in the form of instance type with respect to the subclass concept TYPEOF(ex:obs_1, sct:FingerInjury), the data in the form of instance type with respect to the superclass concept TYPEOF(ex:obs_1, sct:Disorder) can be inferred.

Similarly, for the intersection concept subsumption axiom sub1 ∩ sub2 ⊑ sup, the data conversion engine 105 generates data in the form of instance type with respect to the superclass concept, TYPEOF(ind, sup), according to data in the form of intersection concept subsumption GCIINTER(sub1, sub2, sup), data in the form of instance type with respect to a first subclass concept, TYPEOF(ind, sub1), and data in the form of instance type with respect to a second subclass concept, TYPEOF(ind, sub2). This means that, if the individual "ind" is an instance type of the subclass concept "sub1" as well as an instance type of the subclass concept "sub2", and the conjunction of the subclass concept "sub1" and the subclass concept "sub2" is subsumed by the superclass concept "sup", then individual "ind" can also be inferred as an instance type of the superclass concept "sup".

Based on the same principle, for the existential restriction left subsumption axiom ∃role.sub ⊑ sup, the data conversion engine 105 generates data in the form of instance type with respect to the superclass concept, TYPEOF(ind1, sup), according to data in the form of existential restriction left subsumption GCIEXISTS(role, sub, sup), data in the form of instance role RELATIONSHIP(ind1, role, ind2), and data in the form of instance type with respect to the subclass concept, TYPEOF(ind2, sub). This means that, if a first individual "ind1" and a second individual "ind2" have a role relationship, the second individual "ind2" is an instance type of the subclass concept "sub", and the existential restriction with respect to the role "role" and the concept "sub" is subsumed by the superclass concept "sup", then the first individual "ind1" can be inferred as an instance type of the superclass concept "sup".

Furthermore, for the role subsumption axiom role1 ⊑ role2, the data conversion engine 105 generates data in the form of instance role with respect to a second role RELATIONSHIP(ind1, role2, ind2), according to data in the form of role subsumption SUBROLE(role1, role2), and data in the form of instance role with respect to a first role RELATIONSHIP(ind1, role1, ind2). This means that, if the role "role1" is subsumed by the role "role2", and the first individual "ind1" and the second individual "ind2" have an instance role "role1" relationship therebetween, then it can be inferred that the first individual "ind1" and the second individual "ind2" also have an instance role "role2" relationship therebetween.

Moreover, for the role chain subsumption axiom role1 °role2 ⊑ role3, the data conversion engine 105 generates data in the form of instance role with respect to the first individual, the third role and the third individual, RELATIONSHIP(ind1, role3, ind3), according to data in the form of role chain subsumption ROLECHAIN(role1, role2, role3), data in the form of instance role with respect to the first individual, the first role and the second individual RELATIONSHIP(ind1, role1, ind2), and data in the form of instance role with respect to the second individual, the second role and the third individual RELATIONSHIP(ind2, role2, ind3). This means that, if the first individual "ind1" and the second individual "ind2" have an instance role "role1" relationship therebetween, the second individual "ind2" and the third individual "ind3" have an instance role "role2" relationship therebetween, and the instance role "role1", the instance role "role2" and the instance role "role3" have a role chain subsumption relationship role1 °role2 ⊑ role3 therebetween, then it can be inferred that the first individual "ind1" and the third individual "ind3" have an instance role "role3" relationship therebetween.

It should be noted that for existential restriction right subsumption axiom sub ⊑ ∃role.sup, the data conversion engine 105 generates data in the form of instance role with respect to a named individual and a canonical individual RELATIONSHIP(ind, role, ind') and data in the form of instance type with respect to the canonical individual TYPEOF(ind', sup), according to data in the form of the existential restriction right subsumption EXISTSSUB(sub, role, sup), data in the form of instance type TYPEOF(ind, sub), and the canonical individual generated by the canonical individual generation unit 103 and its corresponding role and concept, CANONIND (ind', role, sup).

In other words, if an individual "ind" is a type of a subclass concept "sub" in the data in the form of existential restriction right subsumption EXISTSSUB(sub, role, sup), and there is a canonical individual "ind'" with respect to the role "role" and the superclass concept "sup", then RELATIONSHIP(ind, role, ind') and TYPEOF (ind', sup) can be inferred out.

In practice, the logical semantics of sub⊆ ∃role.sup has exceeded the scope of Datalog rules. In the prior art, for each individual "ind1" is a type of the subclass concept "sub", a new individual "ind2" and corresponding relationship data such as RELATIONSHIP(ind1, role, ind2) and TYPEOF (ind2, sup) have to be generated for the individual "ind1". When there are massive instances of the subclass concept "sub", a large amount of new individuals and relationship data are to be generated, and with the generated individuals applied in the Datalog rules shown in Table 1 for iterative evaluation, time cost is quite expensive.

On the contrary, in the embodiments of the present invention, a canonical individual "ind'" is generated for an existential restriction ∃role.sup. Therefore, it is no longer necessary to generate a new individual "ind2" for each specific individual "ind1" of this type, while sharing with the same canonical individual "ind'". Therefore, the number of newly generated individuals can be dramatically reduced. Correspondingly, time spent on iterative reasoning of the Datalog rules shown in Table 1 can be significantly reduced.

Referring to the specific example discussed above, besides the generated canonical individual CANONIND(ex:uuu_1, sct:findingSite, sct:Finger), there also exists triple data EXISTSSUB (sct:FingerInjury, sct:findingSite, sct:Finger) and TYPEOF(ex:obs_1, sct:FingerInjury). Therefore, new data RELATIONSHIP(ex:obs_1, sct:findingSite, ex:uuu_1) and TYPEOF(ex:uuu_1, sct:Finger) can be inferred.

So far, for the specific example discussed above, besides the originally asserted triple data, we have newly inferred triples shown below for providing answers to semantic queries.

| ex:obs_1 | rdf:type | sct:Disorder. |
|---|---|---|
| ex:obs_1 | sct:findingSite | ex:uuu_1. |
| ex:uuu_1 | rdf:type | sct:Finger. |

Utilizing the newly generated triple data and originally asserted triple data, answers to the sample query given in the above can be achieved very rapidly and easily.

However, due to the semantic approximation of existential restriction right subsumption axioms sub⊆ ∃role.sup when the canonical individual generation unit 103 generates the canonical individuals, not all queries are answered correctly.

For example, for the SNOMED-CT concept "Finger" defined as part of "Hand" and "Hand" as part of "Upper Limb", there are two existential restrictions, i.e., "sct:partOf.sct:Hand" and "sct:partOf.sct:UpperLimb", so that the canonical individual generation unit 103 generates two canonical individuals such as ex:u1 and ex:u2, and stores them in the relational database 109 as CANONIND(ex:u1, sct:partOf, sct:Hand) and CANONIND(ex:u2, sct:partOf, sct:UpperLimb), respectively.

Furthermore, suppose that in the relational database 109 "yourFinger" is stored as TYPEOF(ex:yourFinger, sct:Finger). From the SNOMED-CT ontology knowledge, the ontology normalization unit 101 can obtain EXISTSSUB(sct:Finger, sct:partOf, sct:Hand) and EXISTSSUB(sct:Hand, sct:partOf, sct:UpperLimb). Based on the original data and the generated data from the canonical individual generation unit 103, the data conversion engine 105 infers according to the Datalog rules for the existential restriction right subsumption axiom sub⊆ ∃role.sup, and can generate new data RELATIONSHIP(ex:yourFinger, sct:partOf, ex:u1), TYPEOF(ex: u1, sct:Hand), RELATIONSHIP(ex:u1, sct:partOf, ex:u2), and TYPEOF(ex:u2, sct:UpperLimb).

In the following, suppose in the relational database 109 "myFinger" is stored as TYPEOF(ex:myFinger, sct:Finger) and "myHand" is stored as TYPEOF(ex:myHand, sct:Hand), and the instance relationship of the two is stored as RELATIONSHIP(ex:myFinger, sct:partOf, ex:myHand). Similarly, the data conversion engine 105 infers according to the Datalog rules for the existential restriction right subsumption axiom sub⊆ ∃role.sup and can infer the new data RELATIONSHIP(ex:myHand, sct:partOf, ex:u2). In addition, as sct:partOf is transitive, new data RELATIONSHIP (ex:yourFinger, sct:partOf, ex:u2) and RELATIONSHIP(ex:myFinger, sct:partOf, ex:u2) can be inferred.

The relationships between data generated by the ontology normalization unit 101, the canonical individual generation unit 103 and the data conversion engine 105 can be illustrated clearly with the tree shown in FIG. 3(b). In FIG. 3(b), "a" represents "my finger", "b" represents "my hand", "c" represents "your finger", and "u1" and "u2" represent the canonical individuals generated by the canonical individual generation unit 103 for "sct:partOf.sct:Hand" and "sct:partOf.sct:UpperLimb", respectively.

Next, we perform a query for "which two ones are part of the same one", i.e., perform the fork query "Q(x, y):- sct:partOf(x, z), sct:partOf(y, z)". If a query is performed based on the data completed by the data conversion engine 105, we can conclude "my finger and your finger are part of the same one" as the answer, which is incorrect.

As can be seen from the above example, for a query in the form of a fork, data completed by the canonical individual generation unit 103 and the data conversion engine 105 according to an embodiment of the present invention can result in an erroneous matching of the query fork. The reason for the incorrect query answer is that all instance individuals of all the subclass concept "sub" in the existential restriction right subsumption axiom sub⊆ ∃role.sup share the same canonical individual with respect to the role "role" and the superclass concept "sup" generated for the existential restriction "∃role.sup", and only one canonical individual "ind'" is generated for the same existential restriction "∃role.sup".

In the above example, the query of "sct:partOf(x, z)" and "sct:partOf(y, z)" forms the fork. Because of the existential restriction right subsumption axiom sct:Hand⊑∃ sct:partOf.sct:UpperLimb, the canonical individual "u2" is a canonical individual shared by "my finger" and "u1". Further, as expressive rules such as the transitive rule sct:partOf are to be used in iterative inference and evaluation, the canonical individual "u2" becomes the canonical individual shared by "my finger" and "your finger", which leads to the incorrect answer.

On the other hand, data completed by the canonical individual generation unit 103 and the data conversion engine 105 may actually include correct answers matching the fork query. For example, in the specific example above, "my finger" and "my hand" also share the same canonical individual ex:u2. However, such sharing is not derived from repeated usage of the existential restriction right subsumption axiom, and therefore a correct answer to the above query can be achieved. A base path generation unit 107 according to the present invention filters out incorrect answers by generating a base path starting from a named individual and receiving a canonical individual. Particularly, the base path generation unit 107 first identifies the relationship triples generated by inferring for the existential restriction right subsumption axiom sub⊆ ∃role.sup, as denoted by BT.

Next, the base path generation unit 107 traverses the graph of relationship triples BT, computes a base path $BP(u_k)$ consisting of nodes $u_0, u_1, \ldots, u_k$, where $u_0$ is a named individual and $u_1, \ldots, u_k$ are canonical individuals, and for any $0 \leq i < k$, $<u_i, u_{i+1}> \in BT$. $u_0$ is referred to as the head of the base path, and $u_k$ is referred to as the tail of the base path.

Finally, all the base paths are stored in the form of BPath (path, tail, node) by the base path generation unit 107, such that the path is a base path, the tail is a tail of the base path, and the "node" is a node directly located in the base path, $u_i$ ($0 \leq i < k$), or a node indirectly located in the base path. Here, the node indirectly located in the base path is a named individual v having the instance role relationship RELATIONSHIP(v, r, $u_0$).

In the specific example discussed above, three base paths can be generated according to the processing by the base path generation unit 107, i.e., b*u2, c*u1, and c*u1 *u2, with * representing the concatenation of nodes. Similarly, for simplification, "a", "b" and "c" here represent "my finger", "my hand" and "your finger" respectively, and "u1" and "u2" represent the canonical individuals generated by the canonical individual generation unit 103 for the existential restrictions "∃sct:partOf.sct:Hand" and "∃sct:partOf.sct:UpperLimb" respectively. Table 2 below shows a storage form of the base paths generated by the base path generation unit 107, where "a" is indirectly located in the base path b*u2 because of RELATIONSHIP(ex:myFinger, sct:partOf, ex:myHand), and ex:myHand is just the head b of the base path b*u2.

TABLE 2

Base path storage table

| Path | Tail | node |
|---|---|---|
| b*u2 | u2 | B |
| b*u2 | u2 | A |
| c*u1 | u1 | C |
| c*u1*u2 | u2 | C |
| c*u1*u2 | u2 | U1 |

After the completion and enrichment of the relational database 109 by the ontology normalization unit 101, canonical individual generation unit 103, data conversion engine 105 and the base path generation unit 107, a query rewriting unit 111 further appends a query condition for the fork in the query, for completeness of the answers. That is, based on the base path criterion that the data fork matches the query fork in a single base path, in the event that the root variable of the fork is matched with a canonical individual, a base path is required such that all matching of variables in the fork are nodes directly or indirectly located in the base path.

The operation principle of the query rewriting unit 111 in the database-based semantic query answering system according to an embodiment of the present invention is explained in detail hereinafter.

First, for each root node in the query, the query rewriting unit 111 identifies each fork in the query according to a fork traversing principle, as denoted by $(\{s_1, \ldots, s_n\}, t)$, where t is a root node in the query, and $s_1, \ldots, s_n$ are nodes included in the fork with t as the root node.

Particularly, given a query q, $R_q$ is used to denote the set of root nodes of the fork in the query q such that $R_q := \{t | \#\{s | R(s,t) \in q\} > 1\}$. Then, for each root node $t \in R_q$, we compute the set of elements of the fork such that $S_0 := \{s | R(s,t) \in q\}$ and $S_{i+1} := S_i \cup \{s' | R'(s',t') \in q, t' \in S_i\}$, and the computation terminates when $S_{i+1}$ reaches a fix point, i.e. $S_{i+1} = S_i$. At this time, $S_t$ is used to denote the set of nodes included in the fork t, i.e., $S_t := \cup_{i \geq 0} S_i$, and each fork in the query q is denoted as a pair $(S_t, t)$ where $t \in R_q$. Here, $S_t$ can also be denoted as $\{s_1, \ldots, s_n\}$.

After identifying all forks in the query, the query rewriting unit 111 appends a query condition CANONIND(t)∃ p. BPath(p, t, $s_1$), ..., BPath(p, t, $s_n$) to each fork in the query ($\{s_1, \ldots, s_n\}$, t), where CANONIND(t) represents that the root variable t is matched with a canonical individual generated by the canonical individual generation unit, ∃ p represents the existence of a base path p generated by the base path generation unit, and BPath(p, t, $s_1$), ..., BPath(p, t, $s_n$) represents that the base path generation unit stores the paths of variables of $s_1, \ldots, s_n$ in the fork.

For the query Q(x, y) sct:partOf(x, z), sct:partOf(y, z) discussed above, as the query has a fork ($\{x, y\}$, z), the query rewriting unit 111 can be rewritten as:

Q(x, y):- sct:partOf(x, z), sct:partOf(y, z), (CANONIND(z)→BPath(p, z, x), BPath(p, z, y)).

The query that is rewritten by the query rewriting unit 111 is submitted to the relational database 109 completed and enriched by the ontology normalization unit 101, the canonical individual generation unit 103, the data conversion engine 105 and the base path generation unit 107, and a correct query answer can be achieved, i.e., the answers including "my finger" and "my hand" are returned, and the answers including "my finger" and "your finger" are excluded.

It should be noted that, in the database-based semantic query answering system described above, a semantic database generating system can be configured from the ontology normalization unit 101, the canonical individual generation unit 103, the data conversion engine 105, the base path generation unit 107 and the relational database 109, and the original data can be extended and completed in advance according to EL+ ontology knowledge, to facilitate the query. Thus, in real-time query, it is only necessary to rewrite the output query using the query rewriting unit 111, so as to achieve complete query answers efficiently and effectively.

The structure and the detailed operation principle of a database-based semantic query answering system according to an embodiment of the present invention have been described above with reference to FIG. 1 to FIG. 3. The process of a database-based semantic query answering method according to an embodiment of the present invention is described hereinafter with reference to FIG. 4.

Figure 4:
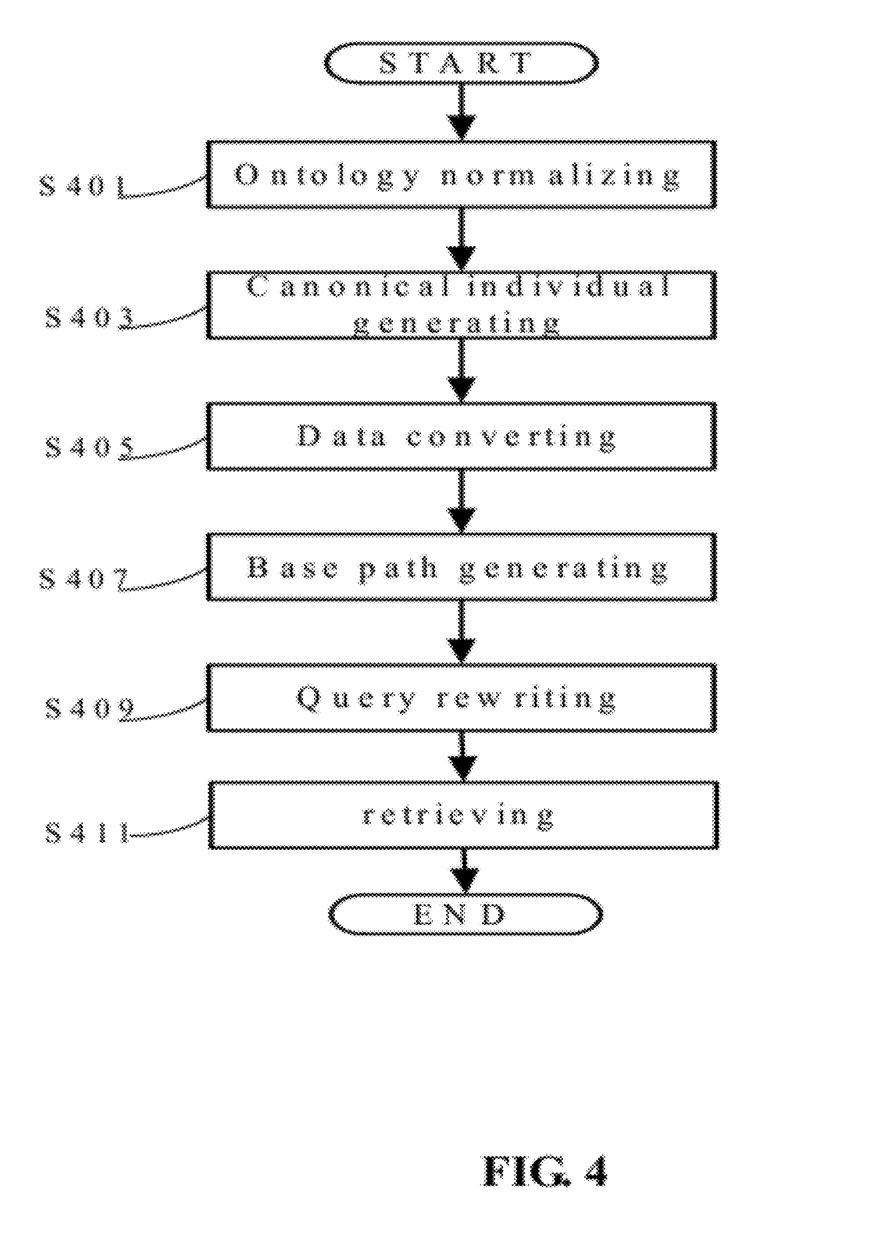
FIG. 4 illustrates a flowchart of the processing of the database-based semantic query method according to an embodiment of the present invention.

As shown in FIG. 4, the database-based semantic query answering method includes an ontology normalizing step S401, a canonical individual generating step S403, a data converting step S405, a base path generating step S407 and a query rewriting step S409.

Similarly, in the database-based semantic query answering method according to an embodiment of the present invention, various original data in the form of RDF triples are stored in a relational database in the form of instance type, i.e., a table TYPEOF(ind, concept), and stored in a relational database in the form of instance role, i.e., a table RELATIONSHIP(ind1, role, ind2). TYPEOF(ind, concept) here represents that the individual "ind" is a type of the concept "concept", and RELATIONSHIP(ind1, role, ind2) represents that the individuals "ind1" and "ind2" have a relationship role therebetween.

As the processing in each of the ontology normalizing step S401, the canonical individual generating step S403, the data converting step S405, the base path generating step S407 and the query rewriting step S409 of the database-based semantic query answering method according to an embodiment of the present invention is similar to that in each module of the ontology normalization unit 101, the canonical individual generation unit 103, the data conversion engine 105, the base path generation unit 107 and the query rewriting unit 111 in database-based semantic query answering system described with reference to FIG. 1, respectively, the detailed description is omitted here.

It should also be noted that, in the database-based semantic query answering method described with reference to FIG. 4, the original data can also be extended and completed in advance based on EL+ ontology knowledge, only by the ontology normalizing step S401, the canonical individual generating step S403, the data converting step S405, and the base path generating step S407, to facilitate the query. Therefore, in real-time query, the output query is rewritten by the query rewriting step S409, thereby achieving complete query answers efficiently and effectively.

The basic principle of the present invention is described in conjunction with the specific embodiments above. However, it should also be pointed out that, those skilled in the art can understand that, each step or component of the method and the apparatus of the present invention can be implemented with hardware, firmware, software or a combination of the foregoing in any computing apparatus (including processors and storage medium, etc) or a network of computing apparatus, which can be achieved by those skilled in the art with their basic programming skills after reading the specification of the present invention.

Therefore, the present invention can also be implemented by executing a program or a series of programs on a computing apparatus. The computing apparatus can be a known general-purpose apparatus. Therefore, the present invention can also be implemented through providing program products including program codes that implement the method or the apparatus. That is, such a program product also constitutes the present invention, and a storage medium storing such a program product also constitutes the invention. The storage medium can be a known storage medium or a storage medium to be developed in the future.

Figure 5:
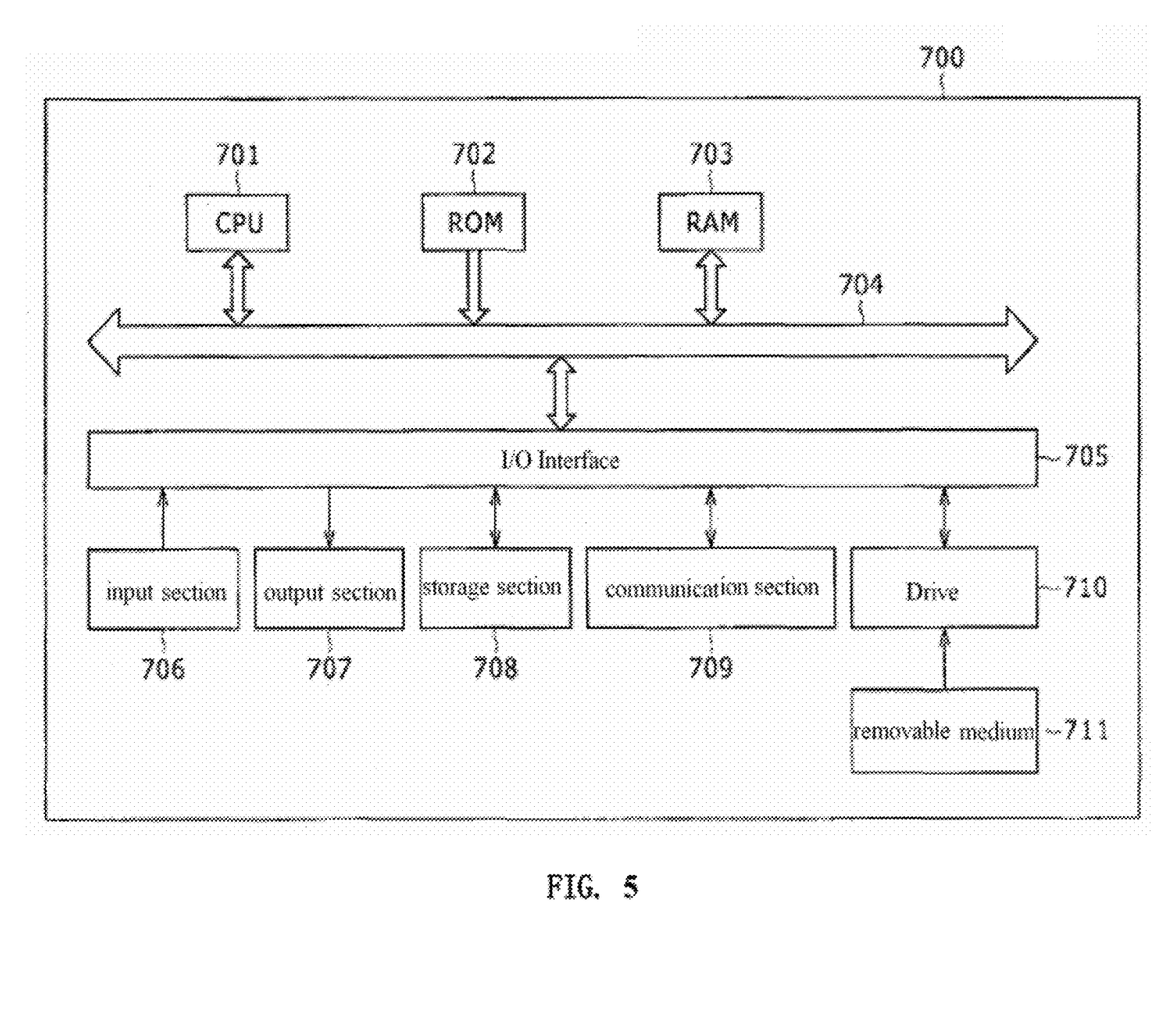
FIG. 5 illustrates a structural block diagram of an information processing device for implementing the database-based semantic query answering method according to the present invention.

In case of implementing the embodiments of the present invention by software and/or firmware, a program constituting the software can be installed into a computer with dedicated hardware, for example, a general-purpose personal computer 700 as shown in FIG. 5 from a storage medium or a network, and the computer is capable of performing various functions with various programs installed therein.

In FIG. 5, a Central Processing Unit (CPU) 701 performs various processes based on a program stored in a Read Only Memory (ROM) 702 or a program loaded from a storage section 708 to a Random Access Memory (RAM) 703. In the RAM 703, data necessary when the CPU 701 performs various processes or the like is also stored as necessary. The CPU 701, the ROM 702, and the RAM 703 are connected to one another via a bus 704. An input/output interface 705 is also connected to the bus 704.

To the input/output interface 705 are connected: an input section 706 including a keyboard, a mouse, or the like; an output section 707 including a display such as a Cathode Ray Tube (CRT), a Liquid Crystal Display (LCD), or the like, and a loudspeaker or the like; the storage section 708 including a hard disk or the like; and a communication section 709 including a network interface card such as a LAN card, a modem, or the like. The communication section 709 performs a communication process via the network such as the Internet.

A drive 710 is also connected to the input/output interface 705 as necessary. A removable medium 711, such as a magnetic disk, an optical disk, a magneto-optical disk, a semiconductor memory, or the like, is installed on the drive 710 as necessary, so that a computer program read therefrom may be installed into the storage section 708 as necessary.

In the case where the above-described series of processes is implemented with software, the program that constitutes the software may be installed from a network such as the Internet or a storage medium such as the removable medium 711.

Those skilled in the art would appreciate that, the storage medium is not limited to the removable medium 711 having the program stored therein, which is delivered separately from the device for providing the program to the user as illustrated in FIG. 5. Examples of the removable medium 711 include a magnetic disk (including a floppy disk (registered trademark)), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 702, the hard disk contained in the storage section 708, or the like, which has the program stored therein and is delivered to the user together with the device that contains them.

It should also be noted that each component and each step can be decomposed and/or recombined in the apparatus and method of the present invention. Such decomposing and/or recombining should be regarded as equivalent solutions of the present invention. Further, the steps of the above-described series of processes may, but not necessarily, be performed chronologically in the natural order of the description. Some steps may be performed in parallel or independently of one another.

The invention and the advantages thereof have been described in details. However, it should be understood that various modifications, substitutions and alterations can occur as they are within the spirit and the scope of the present invention defined by the appended claims. Moreover, the terms "comprise", "comprising," "include" or any other variations thereof in the application, are intended to cover a non-exclusive inclusion so that a process, method, article, or device that comprises a series of elements does not only include these elements but also may include other elements not explicitly listed or elements inherent to such process, method, article, or device. An element preceded by "a" or "an" does not, if without more constraints, preclude the existence of additional identical elements in the process, method, article, or device that comprises the element.

What is claimed is:

1. A computer-implemented method for answering a database-based query of a computerized database system, said method comprising:

generating a canonical individual ind' with respect to a role and a concept, for an existential restriction in an ontology used in said computerized database system;

converting implicit data in original data into explicit data by using said canonical individual ind' and said ontology;

retrieving an answer meeting all query conditions in a query from said original data and said converted explicit data; and normalizing a concept axiom and a role axiom in said ontology into an atomic concept subsumption axiom sub $\subset$ sup, an intersection concept subsumption axiom sub1 $\cap$ sub2 $\subset$ sup, an existential restriction left subsumption axiom $\exists role.sub \subset sup$, an existential restriction right subsumption axiom $sub \subset \exists role.sup$, a role subsumption axiom $role1 \subset role2$, and a role chain subsumption axiom $role1 \circ role2 \subset role3$, wherein sub represents a subclass concept, sup represents a superclass concept, and role represents a role;

wherein said step of converting implicit data in original data into explicit data by using said canonical individual ind' and said ontology comprises:

generating triple data with respect to said original data and said canonical individual ind' based on said normalized concept axiom and said role axiom using said original data and said canonical individual ind' and a corresponding role and concept.

2. The method according to claim 1, further comprising:
generating a base path starting from a named individual and ending at a canonical individual according to said original data and said converted explicit data;
determining whether said query has a fork; and
rewriting said query by appending a first query condition if said query has said fork and a root variable of said fork is matched with said canonical individual according to said original data and said converted explicit data, wherein said first query condition is an existing base path is required such that all matching variables in said fork are nodes directly or indirectly located in said base path.

3. The method according to claim 2, further comprising:
identifying said fork in said query according to a fork traversing principle, wherein said identifying step is performed for a root node in said query.

4. The method according to claim 2, further comprising:
configuring a relational graph from data in the form of instance role with respect to said named individual and said canonical individual according to said original data and said converted explicit data, and data in the form of instance type with respect to said canonical individual according to said original data and said converted explicit data;
traversing said relational graph and computing a base path starting from said named individual and ending at said canonical individual according to said original data and said converted explicit data; and
storing said base path in the form of triples of said base path, a tail of said base path, and nodes directly or indirectly located in said base path.

5. The method according to claim 4, wherein said node indirectly located in said base path is a named individual having a relationship in the form of instance role with said named individual from which said base path starts.

6. The method according to claim 1, wherein said step of converting implicit data in original data into explicit data by using said canonical individual ind' and said ontology further comprises:
converting said original data into data in the form of existential restriction right subsumption EXISTSSUB (sub, role, sup) according to said normalized existential restriction right subsumption axiom $sub \subset \exists role.sup$;
storing data of a membership triple in the form of instance type TYPEOF(ind, concept), and storing data of a relationship triple in the form of instance role RELATIONSHIP(ind1, role, ind2), wherein said TYPEOF(ind, concept) represents that an individual ind is a type of a concept concept, said RELATIONSHIP(ind1, role, ind2) represents that individuals ind1 and ind2 have a role relationship therebetween, and said concept concept is a superclass concept sup or a subclass concept sub;
storing said generated canonical individual ind' and said corresponding role and concept in the form of CANONIND(ind', role, concept); and
generating data in the form of instance role with respect to a named individual and a canonical individual RELATIONSHIP(ind, role, ind') and data in the form of instance type with respect to the canonical individual TYPEOF(ind', sup), according to said data in the form of existential restriction right subsumption EXISTSSUB (sub, role, sup), data in the form of instance type TYPEOF(ind, sub), and data of said canonical individual ind' and corresponding role and concept CANONIND(ind', role, sup).

* * * * *